C. E. GLANDER.
TRAP NEST.
APPLICATION FILED APR. 9, 1919.
1,351,103.
Patented Aug. 31, 1920.
2 SHEETS—SHEET 1.
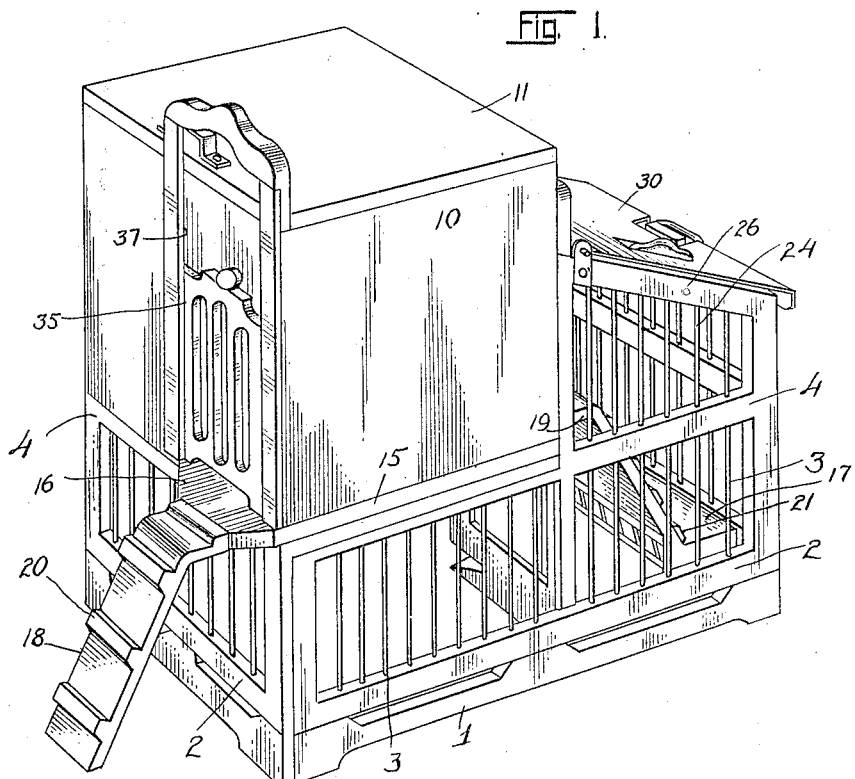
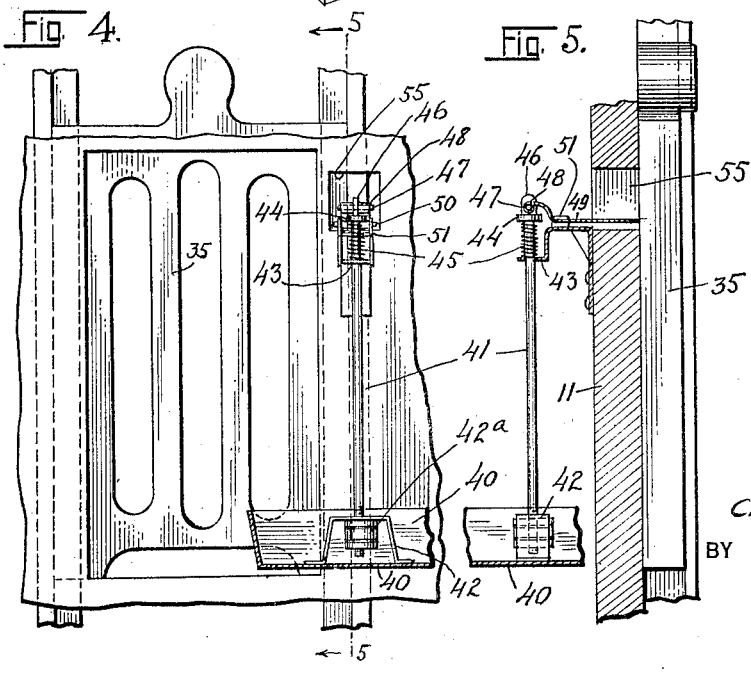
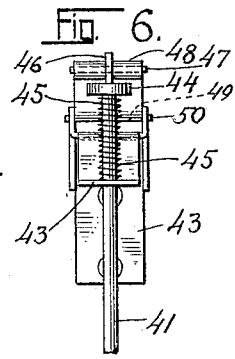
INVENTOR
Charles E. Glander
BY Oscar Geier
ATTORNEY

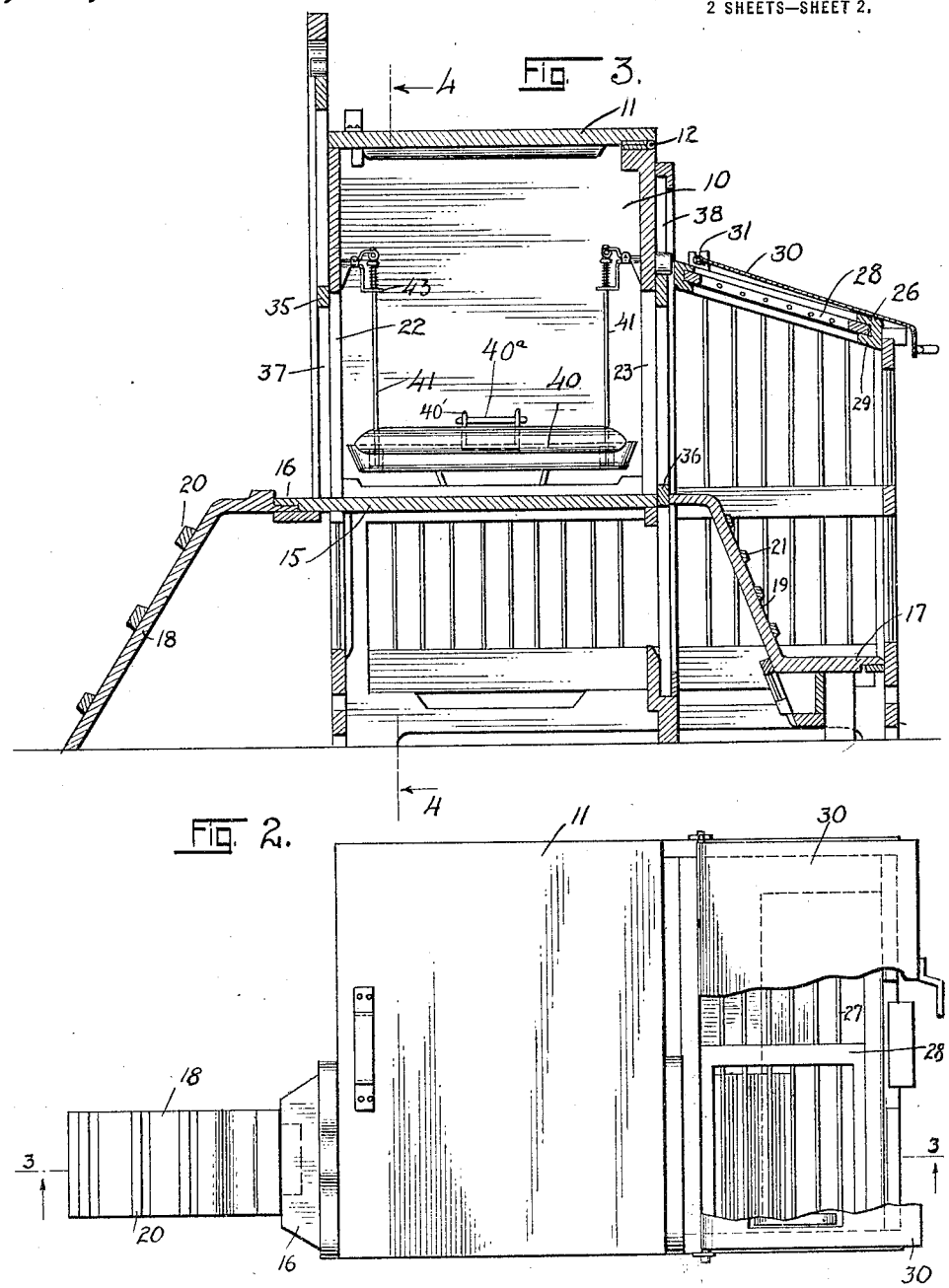

UNITED STATES PATENT OFFICE.

CHARLES EDWARD GLANDER, OF JERSEY CITY, NEW JERSEY.

TRAP-NEST.

1,351,103.   Specification of Letters Patent.   Patented Aug. 31, 1920.

Application filed April 9, 1919. Serial No. 288,685.

*To all whom it may concern:*

Be it known that I, CHARLES EDWARD GLANDER, a citizen of the United States, residing at Jersey City, county of Hudson, and State of New Jersey, have invented certain new and useful Improvements in Trap-Nests, of which the following is a specification.

This invention relates to improvements in portable laying coops for poultry being an improvement upon the type of coop previously patented to me under No. 1,270,283.

The invention has for an object to provide an improved form of automatic door releasing means for the coop which will be simple in construction and readily releasable when a fowl enters the nest.

This and other like objects and advantages are attained by the novel construction and combination of parts hereinafter described and shown in the accompanying drawings forming a material part of this disclosure, and in which—

Figure 1 is a perspective view of a laying coop made in accordance with the invention.

Fig. 2 is a plan view partly broken away.

Fig. 3 is a longitudinal section on the line 3—3 of Fig. 2.

Fig. 4 is an enlarged fragmentary section taken on the line 4—4 of Fig. 3 and illustrating particularly the door operating means.

Fig. 5 is a transverse section approximately on the line 5—5 of Fig. 4.

Fig. 6 is an enlarged face view of the door engaging device.

My improved device is constructed with a frame having the base beams 1 adapted to rest on any substantially level surface. Above these beams are horizontal bars 2 from which rods 3 extend upwardly to other horizontal bars 4, thus providing an open work inclosure.

Above one end portion of the upper horizontal bars 4 is a rectangular structure 10 which may be termed the nest inclosure and is provided with a cover 11 hinged as at 12 so as to be readily raised or lowered to permit of access to the interior.

This structure 10 contains a nest, as will be presently set forth, and the walls thereof are preferably opaque so as to render the interior relatively dark, to make the same attractive to a fowl entering therein.

The flooring 15 of the nest inclosure extends exteriorly thereto in the form of platforms 16 and 17 which may extend downwardly as at 18 and 19 and may be provided with cleats 20 and 21 to facilitate entrance of the fowl to the nest inclosure and egress therefrom.

Above these platforms are door apertures 22 and 23 the former of which opens exteriorly to the coop while the latter opens into the rear part of the coop which is formed by rods 24 extending upwardly from the horizontal bars 4 to an inclined roof frame 26 having fixed horizontal rods 27 extending for a portion of the distance therealong leaving an opening at one end closed by an open work door 28 slidably guided in guides 29 in the roof frame 26.

A cover 30 may be hinged at 31 to the roof frame 26 and may be raised or lowered as desired. This portion of the coop is open directly to the part under the nest inclosure as clearly shown.

The openings 22 and 23 are provided with drop doors 35 and 36 slidable in guides 37 and 38, the former of which extends upwardly as shown to permit of the door 35 being raised to uncover the opening 22 and the latter of which extends downwardly to permit of the door 36 dropping to uncover the opening 23. These doors may be slotted as shown to provide for the entrance of a limited amount of light in the inclosure 10 and permit of inspecting of the latter without opening thereof.

It will be obvious that when both doors are in raised position the opening 22 leading from the outside will be uncovered and the opening 23 leading from the nest inclosure to the remainder of the coop will be closed, this being the normal position when the coop is vacant and ready for the entrance of a fowl thereto.

Within the inclosure 10 is a nest which is here in the form of a pan or tray 40 having a U-shaped strap 40′ attached to one side thereof whereby the said side is hinged to a rail 40$^a$ on the side of the nest inclosure, the pan being disposed a short distance from the floor 15 and secured toward its opposite side to the lower ends of rods 41 which pass through straps 42 fixed to the pan and may have nuts 42$^a$ on their lower ends on which the straps rest.

The upper ends of these rods pass freely through brackets 43 fixed to the walls of the inclosure 10 one rod and one bracket being adjacent to each door opening as clearly shown in Fig. 3 and are provided with heads 44 between which and the brackets 43 are located coiled springs 45 surrounding the rods. Above the heads on each rod is a flat projection 46 suitably bored transversely to receive a pin 47 which also passes through the circular ends 48 of flat arms 49 having projecting pins 50 whereby they are fulcrumed on ears 51 formed on the brackets 43.

These arms project through suitable openings such as indicated at 55 in the walls of the inclosure at the sides of the door openings and have their ends engaging these doors as shown most clearly in Fig. 5. These arms are so arranged as to have their ends wedge or jam into the doors when the arms are in horizontal position, as shown. When in this position the doors are held open by the engagement of the arms therewith. The ends of the arms disengage from the doors by swinging upwardly when the rods 41 are depressed by the weight of the fowl in the nest, allowing the doors to fall and it is to be understood that the strength of the springs 45 is sufficient to overcome the weight of the nest when empty and throw the ends of the arms against the door so that the latter will be automatically engaged by the arms when raised.

When a fowl, however, steps into the nest its weight overcomes the upward pressure of the springs 45 and in consequence the rods 41 are pulled down and the ends of the strips swing upward away from the doors allowing the latter to drop.

It is believed that the manner of use of my improved chicken coop will be apparent from the above description. Normally both of the doors are held in raised position by the means just described, the opening 22 from the exterior into the nest inclosure 10 being open, and the opening 23 from the latter being closed, thus preventing a fowl upon entering the nest inclosure from passing direct to the outer portion of the coop.

When the fowl steps upon the nest the doors 35 and 36 are released and fall by gravity in the guides 37 and 38. The fowl when it leaves the nest is thus prevented from leaving the coop but may pass into the outer and lower portion thereof where grain or the like may be scattered.

The owner may then remove the fowl at any time by opening the sliding door 28 in the roof frame and may reset the doors 35 and 36 for the entrance of another fowl by simply raising the doors which are automatically engaged by the locking strips.

From the foregoing description it will be apparent that a fowl once entering the nest inclosure and resting its weight upon the nest will be automatically detained until removed but permitted the freedom and run of the entire coop. At the same time the fowl is maintained free from interruption or intrusion.

What I claim as new and desire to protect by Letters Patent of the United States is as follows:—

1. A poultry coop comprising a nest inclosure, a main coop extending below and to one side of said inclosure, said nest inclosure having a pair of sliding doors forming entrance and egress openings, a nest within said inclosure, a pair of rods to the lower ends of which said nest is hung, brackets secured to the frames of the respective doors, and a pair of arms pivoted between their ends to the said brackets and having the said rods suspended from one end thereof and their opposite ends adapted to wedge against the said doors to retain the latter in raised position.

2. A poultry coop comprising a nest inclosure, a main coop extending below and to one side of said inclosure, said nest inclosure having a pair of sliding doors forming entrance and egress openings, a nest within said inclosure, a pair of rods to the lower ends of which said nest is hung, brackets secured to the frames of the respective doors, and a pair of arms pivoted between their ends to the said brackets and having the said rods suspended from one end thereof and their opposite ends adapted to wedge against the said doors to retain the latter in raised position, and springs normally urging said rods upward to move said strips into engagement with the doors.

3. In a poultry coop, a pair of gravity actuated doors one of which is adapted to be opened as the other closes, a nest, hinged arms movable in a vertical plane adapted to have their free ends engage said doors with a wedging action to hold them in raised position, and connections between said arms and nest whereby said arms are released from said doors when a fowl enters the nest.

4. In a poultry coop having a pair of sliding doors one of which is adapted to open as the other closes, a nest in said coop, a pair of rods connected at their lower ends to opposite sides of said nest and from which the latter is hung, heads on the upper ends of said rods, a pair of brackets fixed adjacent to said doors through which the said rods pass, springs bearing between the said brackets and the said heads, said springs being of sufficient strength to support the said nest when the latter is empty, arms hinged between their ends too said brackets and connected at one end too said heads, the opposite ends of said arms extending normally in a horizontal position and being adapted to move into jamming engagement with the said doors by the expansion movement of the said springs.

In testimony whereof I have affixed my signature.

CHARLES EDWARD GLANDER.